(12) United States Patent
Lin (10) Patent No.: US 8,215,697 B1
(45) Date of Patent: Jul. 10, 2012

(54) SUNSHADING APPARATUS MOUNTABLE ON A REAR WINDOW OF A VEHICLE

(75) Inventor: Paul Lin, Tainan (TW)

(73) Assignee: Macauto Industrial Co., Ltd., Tainan (TW)

( * ) Notice: Subject to any disclaimer, the term of this patent is extended or adjusted under 35 U.S.C. 154(b) by 0 days.

(21) Appl. No.: 13/016,600

(22) Filed: Jan. 28, 2011

(51) Int. Cl.
*B60J 3/02* (2006.01)

(52) U.S. Cl. .. 296/97.8; 296/143; 160/23.1; 160/370.22

(58) Field of Classification Search .............. 296/97.8, 296/143; 160/23.1, 370.22
See application file for complete search history.

(56) References Cited

U.S. PATENT DOCUMENTS

| 5,423,588 | A * | 6/1995 | Eglinton | 296/98 |
| 6,796,599 | B2 * | 9/2004 | Schlecht et al. | 296/143 |
| 7,089,992 | B2 * | 8/2006 | Walter et al. | 160/370.22 |
| 7,316,443 | B2 * | 1/2008 | Schlecht | 296/97.8 |
| 2007/0144689 | A1 * | 6/2007 | Walter et al. | 160/370.22 |

* cited by examiner

*Primary Examiner* — Dennis Pedder
(74) *Attorney, Agent, or Firm* — Osha Liang LLP (57) ABSTRACT

A sunshading apparatus includes a sunshade cloth having top and bottom ends respectively connected to a cross bar and a winding shaft. The cross bar has two opposite end pieces connected respectively to two track rails. The sunshade cloth passes through the passage opening. Two cover units close openably two opposite end portions of a passage opening formed in a rear window shelf of the vehicle. Each cover unit has two cover plates disposed pivotally at two transversely opposed sides of the passage opening and movable toward each other to a closing position that covers the corresponding end piece, or away from each other to an opening position that permits passage of the corresponding end piece.

13 Claims, 10 Drawing Sheets

SUNSHADING APPARATUS MOUNTABLE ON A REAR WINDOW OF A VEHICLE

FIELD OF THE INVENTION

The invention relates to a sunshading apparatus for a vehicle, more particularly to a sunshading apparatus mountable on a rear window of the vehicle.

DESCRIPTION OF THE RELATED ART

Figure 1:
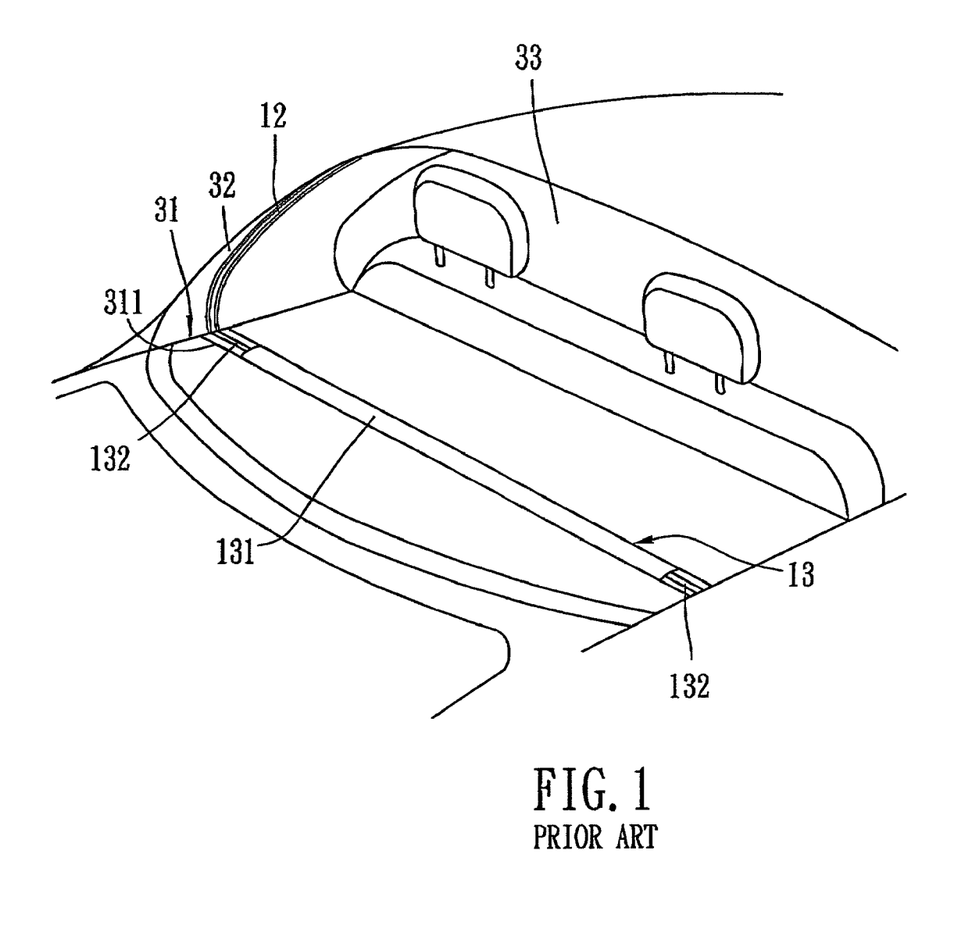
FIG. 1 is a perspective view illustrating a rear part of a vehicle incorporating a conventional sunshading apparatus.
Figure 2:
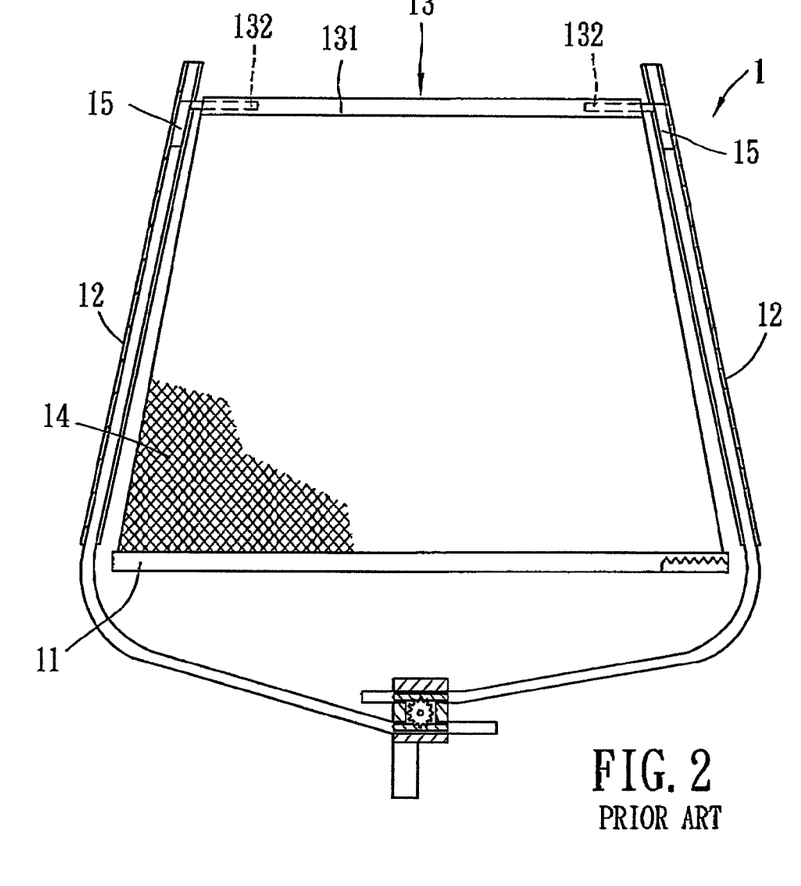
FIG. 2 is a schematic view of the conventional sunshading apparatus.

As shown in FIGS. 1 and 2, a conventional sunshading apparatus 1 mountable on a rear window 33 of a vehicle includes a winding shaft 11 mounted horizontally below a passage opening 311 formed in a rear window shelf 31 and extending along the elongate direction of the rear window shelf 31, a pair of track rails 12 mounted respectively on inner sides of two C-columns 32 (not shown) and extending from two end portions of the passage opening 311 to a top edge of the rear window 33, a cross bar 13 disposed above and parallel to the winding shaft 11 and movable between the passage opening 311 and the top edge of the rear window 33, a pair of slide units 15 connected respectively to two ends of the cross bar 13 and mounted slidably and respectively on the track rails 12, and a sunshade cloth 14 that has top and bottom ends respectively connected to the cross bar 13 and the winding shaft 11 and extending through the passage opening 311.

Since the rear window 33 has a shape tapering in a bottom-to-top direction, the distance between the two track rails 12 decreases in the bottom-to-top direction, and the cross bar 13 must be extendable and retractable to vary the total length thereof. Accordingly, the cross bar 13 usually has a main bar 131 connected to a top edge of the sunshade cloth 14, and two end pieces 132 inserted telescopically and respectively into two opposite ends of the main bar 131. The end pieces 132 are respectively connected to top ends of the slide units 15.

As shown in FIG. 2, when the cross bar 13 is moved to the top edge of the rear window 33, the sunshade cloth 14 is expanded completely, and the end pieces 132 are retracted into the main bar 131 so that the cross bar 13 has its shortest total length. Conversely, when the cross bar 13 moves downward to the passage opening 311 (as shown in FIG. 1), the sunshade cloth 14 is wound completely by the winding shaft 11, and the end pieces 132 project outwardly from the cross-bar 13 so that the cross bar 13 has its longest total length. In this situation, although the main bar 131 is entirely received in the passage opening 311, the two end pieces 132 are uncovered at the two opposite end portions of the passage opening 311. The uncovered end portions of the passage opening 311 not only affect the esthetic appearance of the rear window shelf, but also present a safety hazard.

SUMMARY OF THE INVENTION

An object of the present invention is to provide a sunshading apparatus with a covering unit to cover a passage opening formed in a rear window shelf of a vehicle.

Accordingly, a sunshading apparatus of the present invention is adapted to be mounted on a rear part of a vehicle that has a rear window shelf below a rear window, and two C-columns on two sides of the rear window. The sunshading apparatus comprises: a winding shaft disposed horizontally below a passage opening formed in the rear window shelf; two track rails mounted respectively on the C-columns; a cross bar parallel to and disposed above the winding shaft and moveable upward and downward between the passage opening and a top edge of the rear window; two end pieces inserted telescopically and respectively into two opposite ends of the cross bar; two slide units disposed slidably and respectively on the track rails and connected respectively to the end pieces; a sunshade cloth having top and bottom ends connected respectively to the cross bar and the winding shaft and passing through the passage opening; and two cover units closing openably two opposite end portions of the passage opening to cover the end pieces, respectively. Each of the cover units has two cover plates disposed pivotally at two transversely opposed sides of the passage opening and movable toward each other to a closing position that covers one of the end pieces, or away from each other to an opening position that permits passage of one of the end pieces.

Preferably, each of the cover plates includes a covering plate portion adjacent to the passage opening, and an actuated part extending downward from the covering plate portion. The covering plate portion moves to the closing position when a respective one of the end piece moves into the passage opening and actuates the actuated part. Each of the cover units further includes a biasing unit to bias the covering plate portions of the cover plates to move to the opening position.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail with reference to the accompanying preferred embodiments, it should be noted herein that like elements are denoted by the same reference numerals throughout the disclosure.

Figure 3:
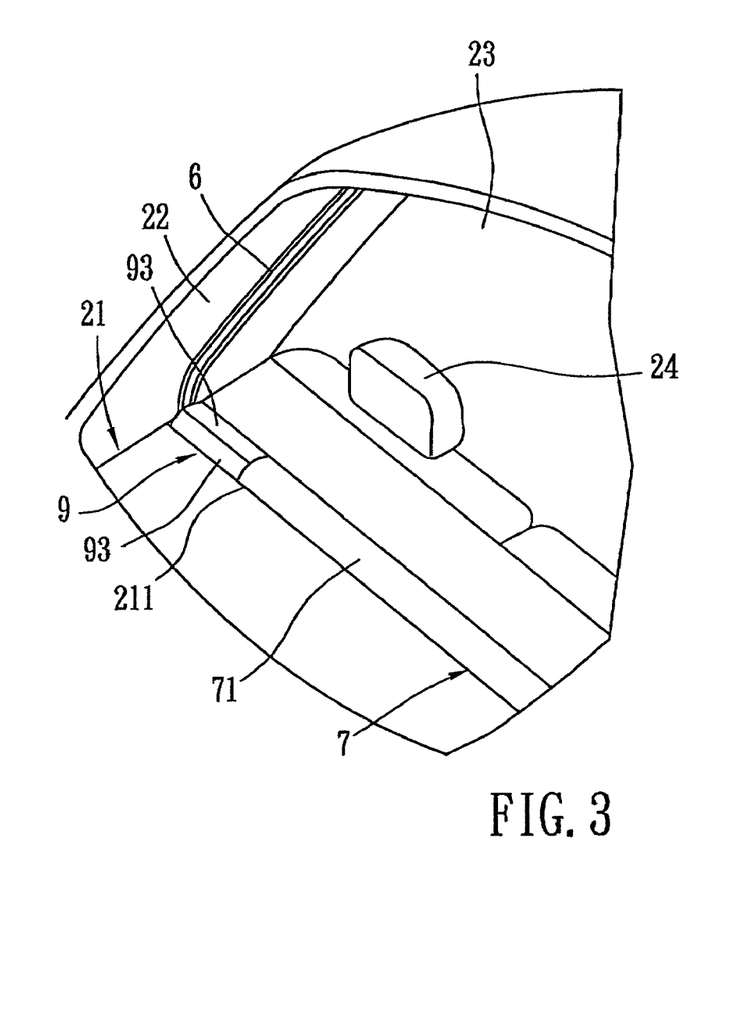
FIG. 3 is a perspective view illustrating a rear part of a vehicle incorporating a sunshading apparatus according to the first preferred embodiment of the present invention.
Figure 4:
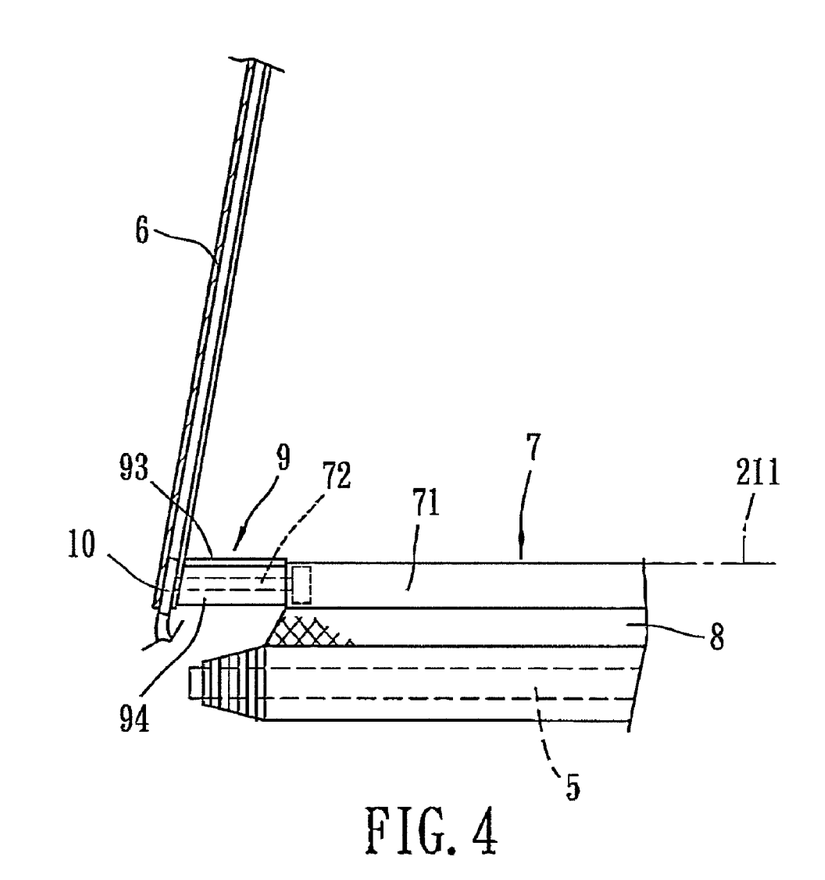
FIG. 4 is a fragmentary enlarged view of the first preferred embodiment.
Figure 5:
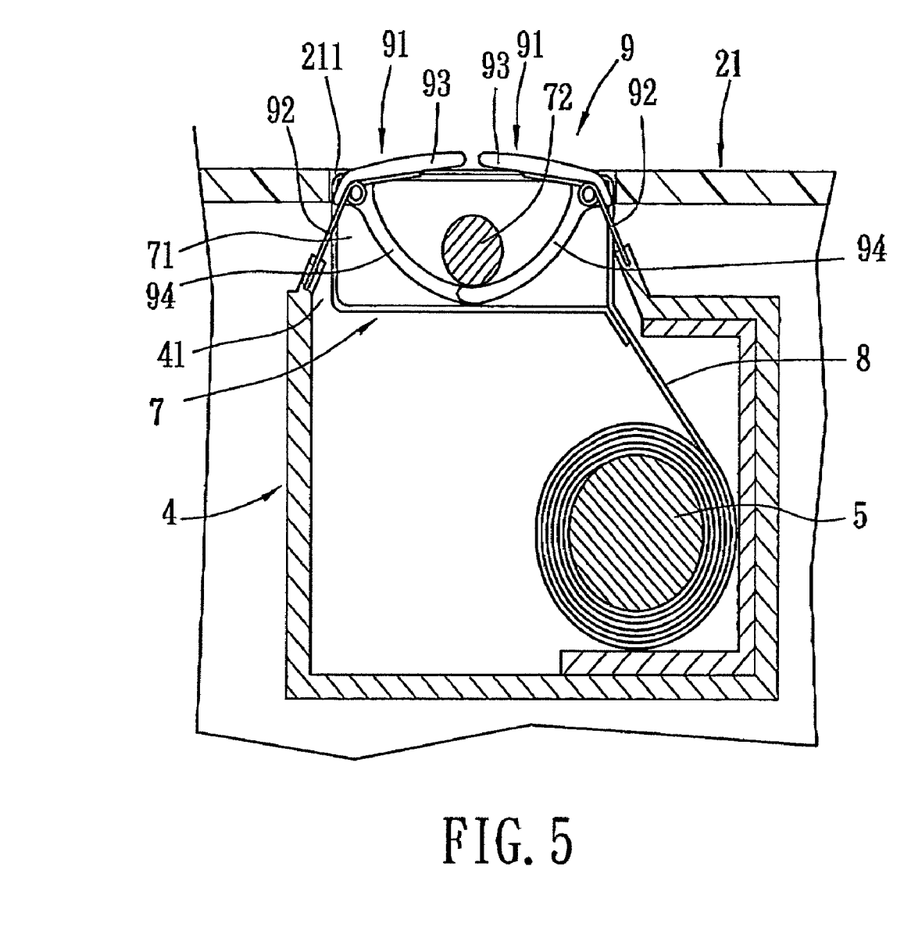
FIG. 5 is a fragmentary sectional view of the first preferred embodiment showing a sunshade cloth that is retracted completely.

Referring to FIGS. 3 to 5, the first preferred embodiment of a sunshading apparatus mountable on a rear window 23 of a vehicle according to the present invention is shown, wherein most of the structure thereof is mounted above and beneath a rear window shelf 21, and the rest of the structure is mounted on inner sides of a pair of C-columns 22 (only the left one of the C-columns 22 is shown). The rear window shelf 21 is disposed below a bottom edge of the rear window 23 at the back of a rear vehicle seat 24 of the vehicle and between the two C-columns 22. The rear window shelf 21 is formed with a passage opening 211 extending along the elongate direction of the rear window shelf 21 and from an inner side of one of the C-columns 22 to an inner side of the other one of the C-columns 22.

The sunshading apparatus includes a winding shaft 5 disposed horizontally below the rear window shelf 21, a pair of casings 4, each of which is mounted below one of two opposite end portions of the passage opening 211, a pair of track rails 6, each of which is mounted on an inner side of one of the C-columns 22, and extends from the passage opening 211 to the top edge of the rear window 23, a cross bar 7 disposed substantially above and parallel to the winding shaft 5 and movable between the passage opening 211 and the top edge of the rear window 23, a pair of slide units 10, each of which is connected to one end of the cross bar 7 and is mounted slidably and respectively on one of the track rails 6, a sunshade cloth 8 that has top and bottom ends respectively connected to the cross bar 7 and the winding shaft 5 and that extends through the passage opening 211, and a pair of cover units 9 closing openably two opposite end portions of the passage opening 211, respectively. Since the sunshading apparatus has left and right symmetric structures, only the left half of the sunshading apparatus, the left one of the C-columns 22, the left parts of the rear window shelf 21 and the rear window 23 are shown in the drawings.

The two casings 4 are disposed beneath the cover units 9, respectively. Each casing 4 has a substantially U-shaped cross section and is formed with a casing opening 41 aligned with the passage opening 211. The cross bar 7 has a bar body 71 connected to a top edge of the sunshade cloth 8, and two end pieces 72 inserted telescopically and respectively into two opposite ends of the bar body 71. Each of the end pieces 72 is further connected to a top portion of one of the slide units 10.

Figure 6:
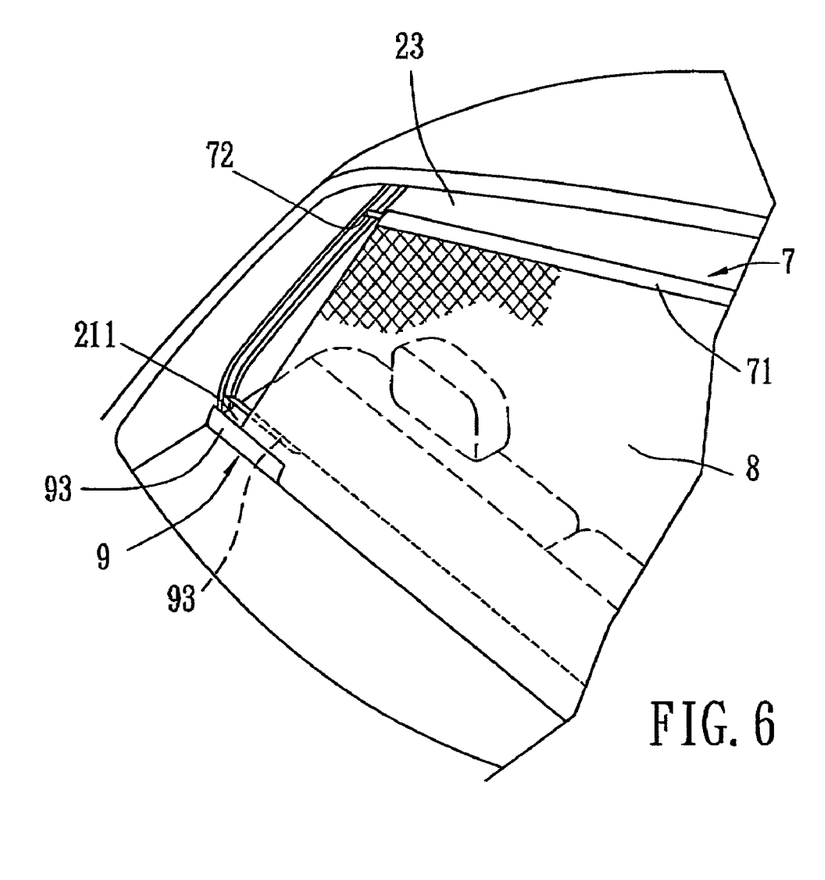
FIG. 6 is the same view as FIG. 3 but showing that the sunshade cloth is expanded.
Figure 7:
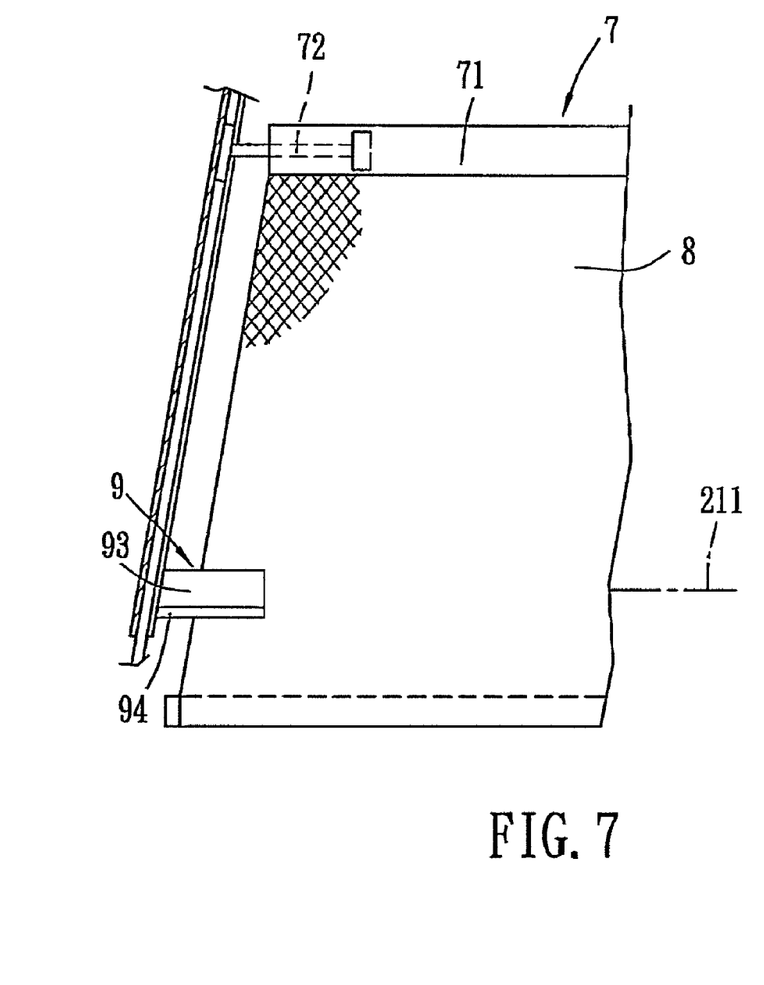
FIG. 7 is the same view as FIG. 4 but showing that the sunshade cloth is expanded.

The cross bar 7 is moveable upward and downward between the passage opening 211 and the top edge of the rear window 23. As shown in FIGS. 6 and 7, when the cross bar 7 is pushed to move toward the top edge of the rear window 23, the two end pieces 72 are retracted into the bar body 71, and the sunshade cloth 8 is completely expanded for shading the rear window 23. As shown in FIGS. 3 and 4, when the cross bar 7 is pulled to move downward and into the passage opening 211, the two end pieces 72 are projected out of the bar body 71, and the sunshade cloth 8 is wound up by the winding shaft 5. Because the driving mechanisms and the details structures of the winding shaft 5 and the cross bar 7 are well known in the art, they are not further detailed herein.

Figure 8:
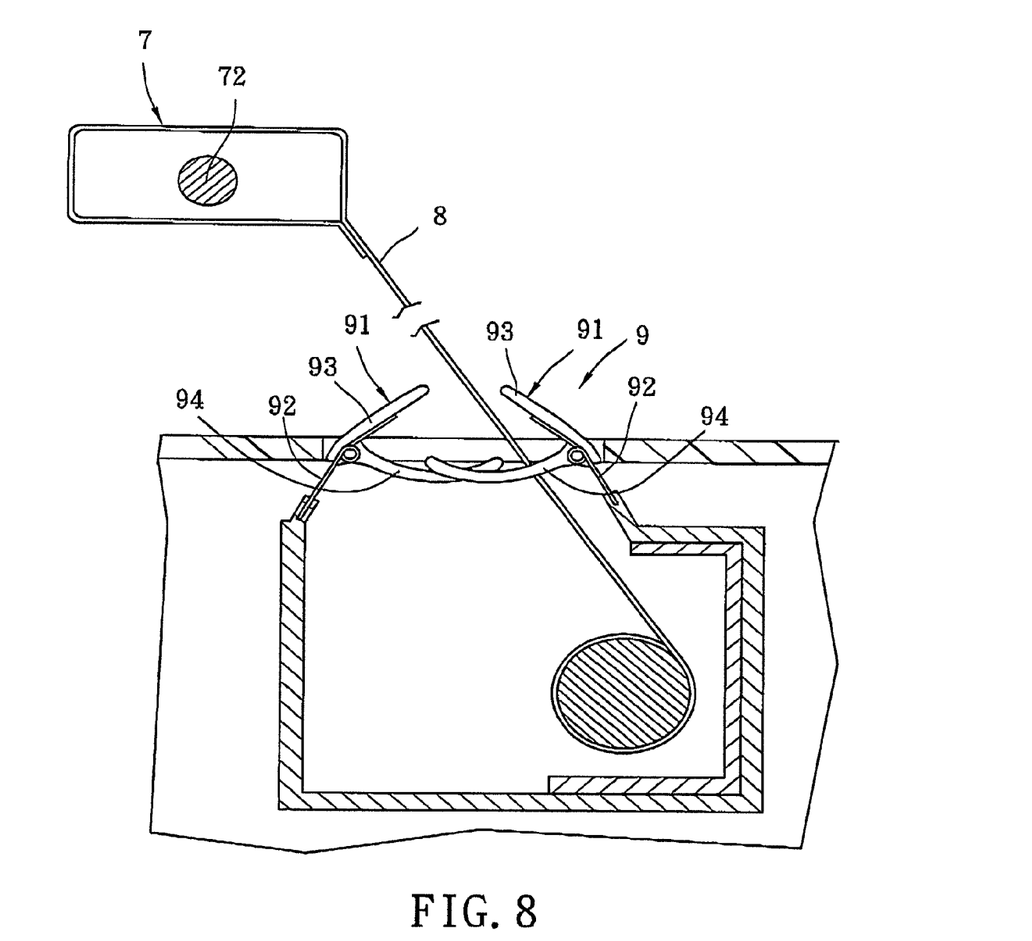
FIG. 8 is the same view as FIG. 5 but showing that the sunshade cloth is expanded.

Referring once again to FIGS. 3 to 5, when the sunshade cloth 8 is folded, and when the cross bar 7 is received in the passage opening 211, the two cover units 9 close and shield the two end pieces 72 completely. Referring to FIGS. 6 to 8, when the cross bar 7 is pushed upward to expand the sunshade cloth 8, the two cover units 9 open immediately to permit the two end pieces 72 to move out of the passage opening 211.

Each of the cover units 9 has two cover plates 91 closing openably and disposed pivotally at two transversely opposed sides of the passage opening 211, and two biasing springs 92 respectively biasing the cover plates 91 to move to an opening position. The biasing springs 92 are stressed when the cover plates 91 are closed.

Each of the cover plates 91 has a V-shaped cross section, and includes a covering plate portion 93 biased by a respective one of the biasing springs 92 to close the passage opening 211, and an actuated part 94 extending downward from one side of the covering plate portion 93 to be pressed downward by one of the end pieces 72 that is moving downward. Moreover, each of the biasing springs 92 has two ends respectively connected to one side of the corresponding casing 4 and an inner side of the corresponding covering plate portion 93. In this embodiment, each of the biasing springs 92 is a torsion spring.

As shown in FIG. 5, when the sunshade cloth 8 is folded, each end piece 72 reaches a position between the two covering plates 91 of one of the covering unit 9. The end piece 72 presses the two actuated parts 94 downward so that the actuated parts 94 are pivoted downward and the covering plate portions 93 are moved toward each other to close the passage opening 211 and to cover the corresponding end piece 72. The biasing springs 92 are therefore stressed. The passage opening 211 is therefore hidden by the corresponding cover unit 9, and no significant gap or seam can be seen on the rear window shelf 21.

On the other hand, as shown in FIG. 8, when the sunshade cloth 8 begins to expand, each end piece 72 of the cross bar 7 moves upward and outwardly of the covering plate portions 93. As soon as the end piece 72 moves upward, the biasing springs 92 return to their normal position causing the covering plate portions 93 to open and the actuated parts 94 to pivot upward. Because the covering plate portions 93 of the cover units 9 open automatically when the sunshade cloth 8 expands, the two end pieces 72 of the crossbar 7 can move upward easily without experiencing any obstruction. Therefore, the sunshading apparatus according to the present invention is not only simple in construction but also is safe for use.

Figure 9:
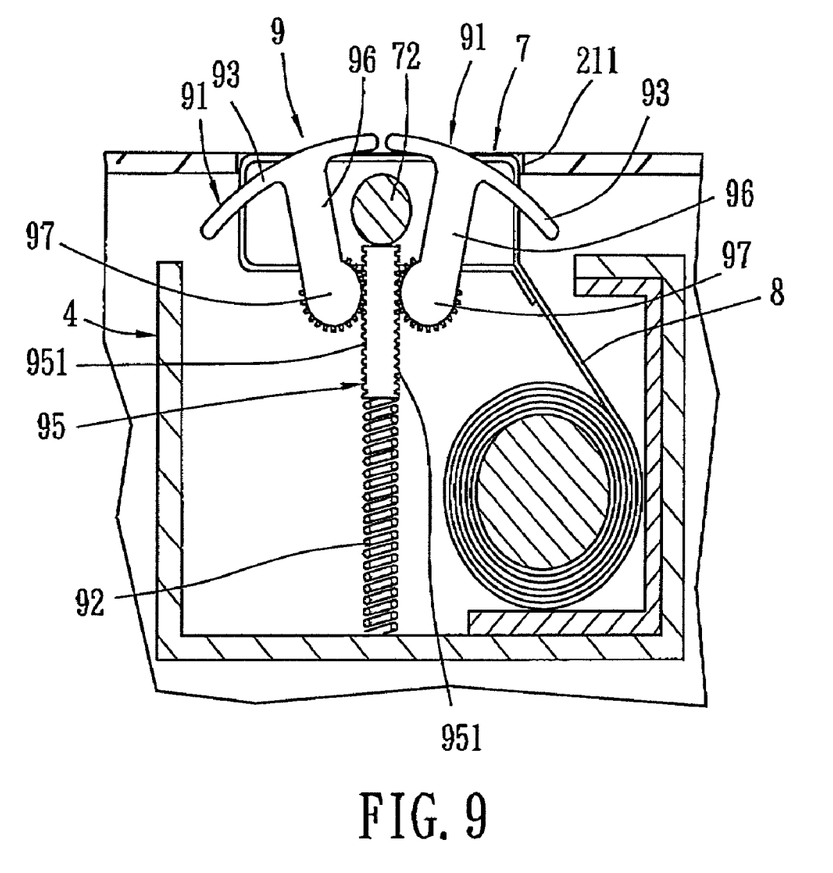
FIG. 9 is a fragmentary sectional view of the second preferred embodiment of a sunshading apparatus according to the present invention, showing that the sunshade cloth is retracted.
Figure 10:
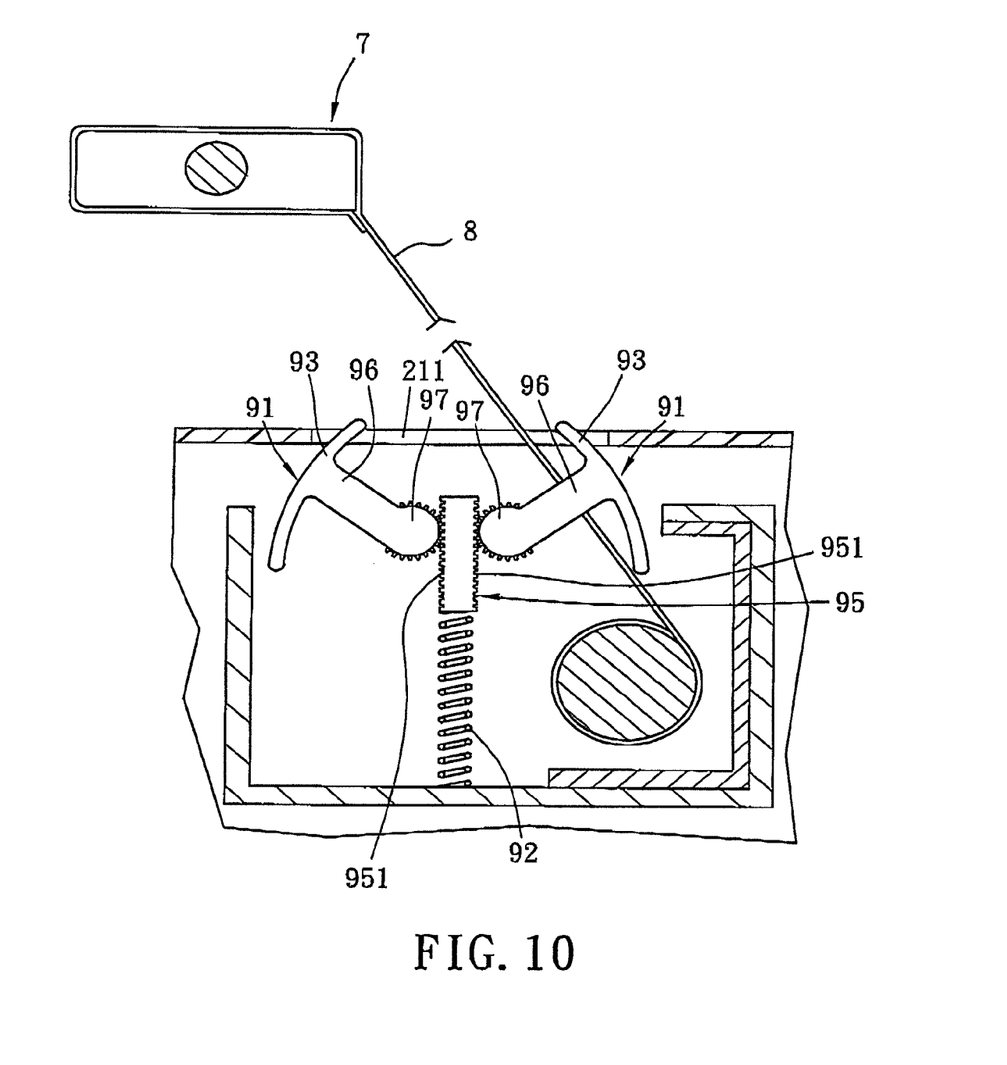
FIG. 10 shows that the sunshade cloth is expanded.

Referring to FIGS. 9 and 10, there is shown the second preferred embodiment of a sunshading apparatus according to the present invention, which differs from the first preferred embodiment in the construction of the cover units 9. Each cover unit 9 has two cover plates 91 disposed pivotally at two transversely opposed sides of the passage opening 211 for closing openably the passage opening 211, a rack 95 that is disposed in the corresponding casing 4 to move upward or downward and that is movable downward by a downward pressure exerted by the corresponding end piece 72, and a single biasing spring 92 that has a bottom end connected to the corresponding casing 4 and a top end connected to a bottom end of the rack 95 to bias the rack 95 to move upward. In this embodiment, the biasing spring 92 is a compression spring.

Each cover plate 91 has a substantially T-shaped cross section, and includes a covering plate portion 93, and an actuated part 96 that extends downward from an intermediate part of the covering plate portion 93 and that has a lower end formed with a gear wheel 97. The rack 95 is disposed between the cover plates 91 to be pressed by one of the end pieces 72, and has two opposite toothed faces 951 respectively intermeshed with the gear wheels 97 of the actuated parts 96.

When the sunshade cloth 8 is folded and the cross bar 7 is moved into the passage opening 211, each end piece 72 of the cross bar 7 enters the corresponding casing 4 and presses the corresponding rack 95 downward, moving the actuated parts 96 and causing the covering plate portions 93 to close the passage opening 211 and to cover the corresponding end piece 72. At this state, the biasing springs 92 are compressed. When the sunshade cloth 8 starts to expand, the cross bar 7 moves upward. Once the end pieces 72 of the cross bar 7 start to move upward, the biasing springs 92 return to their normal expanding position, biasing the racks 95 to move upward. The racks 95 in turn move the actuated parts 96, and open the covering plate portions 93 to permit upward movement of the end pieces 72.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A sunshading apparatus mountable on a rear part of a vehicle that has a rear window shelf below a rear window, and two C-columns on two sides of the rear window, the sunshading apparatus comprising:
    a winding shaft disposed horizontally below a passage opening formed in the rear window shelf;
    two track rails mounted respectively on the C-columns;
    a cross bar parallel to and disposed above said winding shaft and moveable upward and downward between the passage opening and a top edge of the rear window;
    two end pieces inserted telescopically and respectively into two opposite ends of said cross bar;
    two slide units disposed slidably and respectively on said track rails and connected respectively to said end pieces;
    a sunshade cloth having top and bottom ends connected respectively to said cross bar and said winding shaft and passing through said passage opening; and
    two cover units closing openably two opposite end portions of said passage opening to cover said end pieces, respectively, each of said cover units having two cover plates disposed pivotally at two transversely opposed sides of said passage opening and movable toward each other to a closing position, or away from each other to an opening position that permits passage of one of said end pieces.

2. The sunshading apparatus of claim 1, further comprising two casings to receive said cover units, respectively, each of said casings having a casing opening aligned with said passage opening.

3. The sunshading apparatus of claim 2, wherein each of said cover units further includes two biasing springs respectively biasing said cover plates to move to the opening position, each of said biasing springs having two ends respectively connected to one of said casings and one of said cover plates.

4. The sunshading apparatus of claim 3, wherein each of said cover plates has a V-shaped cross section, and includes a covering plate portion biased by a respective one of said biasing springs to move to the opening position, and an actuated part extending downward from one side of said covering plate portion to be pressed downward by one of said end pieces.

5. The sunshading apparatus of claim 2, wherein each of said cover units further has a rack that is disposed in one of said casings to move upward or downward and that is movable downward by a downward pressure exerted by one of the end pieces, and a biasing spring that has a bottom end connected to a respective one of said casings and a top end connected to a bottom end of said rack to bias said rack to move upward, said rack having two opposite toothed faces respectively meshed with said cover plates.

6. The sunshading apparatus of claim 5, wherein each of said cover plates has a substantially T-shaped cross section, and includes a covering plate portion, and an actuated part extending downward from said covering plate portion, said actuated part having a lower end formed with a gearwheel meshed with one of said toothed faces of said rack.

7. The sunshading apparatus of claim 1, wherein each of said cover plates includes a covering plate portion adjacent to said passage opening, and an actuated part extending downwardly from said covering plate portion, said covering plate portion moving to the closing position when a respective one of said end pieces moves into said passage opening and actuates said actuated part.

8. The sunshading apparatus of claim 7, wherein each of said cover units further includes a biasing unit to bias said covering plate portions of said cover plates to move to the opening position.

9. The sunshading apparatus of claim 8, further comprising two casings to receive said cover units, respectively, each of said casings having a casing opening aligned with said passage opening.

10. The sunshading apparatus of claim 9, wherein each of said cover plates has a V-shaped cross section, said actuated part extending inclinedly and downwardly from one side of said covering plate portion, said biasing unit including two torsion springs, each of which has one end connected to a respective one of said covering plate portions and the other end connected to a respective one of said casings.

11. The sunshading apparatus of claim 9, wherein each of said cover plates has a T-shaped cross section, said actuated part extending downwardly from an intermediate part of said covering plate portion, each of said cover units further including a rack disposed between said cover plates to be pressed by one of said end pieces, and meshed with said actuated parts of said cover plates.

12. The sunshading apparatus of claim 11, wherein each of said cover units further includes a biasing spring biasing said rack to move upward.

13. The sunshading apparatus of claim 12, wherein said actuated part of each of said cover plates has a lower end formed with a gear wheel, said rack having two opposite toothed faces respectively meshed with said gear wheels of said actuated parts of said cover plates.

* * * * *